US011639442B2

(12) United States Patent
Mechrez et al.

(10) Patent No.: US 11,639,442 B2
(45) Date of Patent: May 2, 2023

(54) METHOD FOR LARGE SCALE FABRICATION OF JANUS/AMPHIPHILIC PARTICLES USING POLYMER PRECIPITATION PROCEDURE

(71) Applicant: The State of Israel, Ministry of Agriculture & Rural Development, Agricultural Research Organization, Rishon Lezion (IL)

(72) Inventors: Guy Mechrez, Rishon Lezion (IL); Karthik Ananth, Rishon Lezion (IL)

(73) Assignee: THE STATE OF ISRAEL, MINISTRY OF AGRICULTURE & RURAL DEVELOPMENT, AGRICULTURAL RESEARCH ORGANIZATION, Rishon Lezion (IL)

( * ) Notice: Subject to any disclaimer, the term of this patent is extended or adjusted under 35 U.S.C. 154(b) by 85 days.

(21) Appl. No.: 16/767,601

(22) PCT Filed: Nov. 29, 2018

(86) PCT No.: PCT/IB2018/059445
§ 371 (c)(1),
(2) Date: May 28, 2020

(87) PCT Pub. No.: WO2019/106590
PCT Pub. Date: Jun. 6, 2019

(65) Prior Publication Data
US 2020/0291236 A1      Sep. 17, 2020

Related U.S. Application Data

(60) Provisional application No. 62/591,794, filed on Nov. 29, 2017.

(51) Int. Cl.
*C09C 1/30*        (2006.01)
*C08J 3/14*        (2006.01)
(Continued)

(52) U.S. Cl.
CPC ............. *C09C 1/3081* (2013.01); *C08J 3/095* (2013.01); *C08J 3/11* (2013.01); *C08J 3/14* (2013.01);
(Continued)

(58) Field of Classification Search
None
See application file for complete search history.

(56) References Cited

U.S. PATENT DOCUMENTS

| | | | |
|---|---|---|---|
| 10,836,918 B2 * | 11/2020 | Malic ..................... | C09D 11/03 |
| 2008/0234394 A1 | 9/2008 | Hong et al. | |
| 2020/0062788 A1 * | 2/2020 | Czaplewski-Campbell ................ | C07F 9/06 |

FOREIGN PATENT DOCUMENTS

DE        19742759 A1     4/1999

OTHER PUBLICATIONS

Hong L. et al. "Simple Method to Produce Janus Colloidal Particles in Large Quantity", Langmuir, American Chemical Society, US, vol. 22, No. 23, Oct. 17, 2006, pp. 9495-9499.
(Continued)

*Primary Examiner* — Tae H Yoon
(74) *Attorney, Agent, or Firm* — Mark M. Friedman (57) ABSTRACT

This invention provides a method for creating a large-scale of amphiphilic particles. The method includes: adding nanoparticles into a polycarbonate-based solution, adding a surfactant into the solution while performing ultra-sonication to generate polymer precipitation, creating at least one microsphere with the nanoparticles embedded onto it, subjecting the exposed hemisphere of the embedded nanoparticles to a further amphiphilic particles related modification, and dissolving the at least one microsphere in a polycarbonate-based solution in order to free said embedded nanoparticles from the at least one microsphere.

7 Claims, 6 Drawing Sheets

(51) Int. Cl.
    *C08J 3/11*          (2006.01)
    *C08J 3/09*          (2006.01)
    *C08J 7/12*          (2006.01)

(52) U.S. Cl.
    CPC ............... *C08J 7/12* (2013.01); *C09C 1/309* (2013.01); *C09C 1/3063* (2013.01); *C08J 2383/04* (2013.01)

(56) References Cited

OTHER PUBLICATIONS

Mani K. et al. "A Robust Fabrication Method for Amphiphilic Janus Particles via Immobilization on Polycarbonate Microspheres", Polymers vol. 10, No. 8 #900, Aug. 10, 2018, pp. 1-17.
Poggi E. et al. "Janus particles: from synthesis to application", Colloid Polym. Sci., vol. 295, pp. 2083-2108, DOI: 10.1007/00396-017-4192-8 (published on-line Sep. 7, 2017).

* cited by examiner

METHOD FOR LARGE SCALE FABRICATION OF JANUS/AMPHIPHILIC PARTICLES USING POLYMER PRECIPITATION PROCEDURE

CROSS-REFERENCES TO RELATED APPLICATIONS

This application is a National Stage Entry of International Application No. PCT/IB2018/059445, which claims priority from commonly owned US Provisional Patent Application: U.S. Provisional Patent Application Ser. No. 62/591,794, entitled: Method for Large Scale Fabrication of Janus/amphiphilic particles using Polymer Precipitation procedure, filed on Nov. 29, 2017, the disclosure of which is incorporated by reference in its entirety herein.

TECHNICAL FIELD

The present invention relates to the field of producing micro and nanoparticles.

BACKGROUND OF THE INVENTION

Janus particles are special types of particles, which were first introduced by Nobel Laureate P. G. de Gennes in 1991. Named after the Roman god Janus, these anisotropic particles can impart distinctly different chemical or physical properties and directionality within a single particle. Janus particles have a range of asymmetrical particle architectures, from spherical to different kinds of dumbbell shapes to cylinders or disks, and their physical properties and self-assembly behavior have been studied in various fields of applications, such as particulate surfactants in emulsion stabilization, modulated optical nanoprobes, and surface catalysts.

SUMMARY OF THE INVENTION

The present invention provides a method for producing large amounts of Janus/amphiphilic particles using polymer precipitation techniques. Embodiments of the present invention are directed to a method for creating a large-scale of amphiphilic particles. The method comprises: adding nanoparticles into a polycarbonate-based solution; adding a surfactant into the solution while performing ultra-sonication to generate polymer precipitation, the polymer precipitation is configured for creating at least one microsphere with the nanoparticles embedded onto it, the nanoparticles are embedded such that one of their hemispheres is exposed for further modification; subjecting the exposed hemisphere of the embedded nanoparticles to a further amphiphilic particles related modification; and dissolving the at least one microsphere in a polycarbonate-based solution in order to free said embedded nanoparticles from the at least one microsphere.

Optionally, the method additionally comprises: filtering the at least one microsphere using centrifugation, rinsing the at least one microsphere with deionized water and drying the at least one microsphere under vacuum before subjecting the exposed hemisphere of the embedded nanoparticles to a further amphiphilic particles related modification.

Optionally, the polycarbonate-based solution includes tetrahydrofuran (THF).

Optionally, the nanoparticles are polymethylsilsesquioxane (PMSQ) nanoparticles.

Optionally, the nanoparticles are silica nanoparticles.

Optionally, the surfactant is Dimethyl didodecyl ammonium bromide (DDAB) in water.

Optionally, the further amphiphilic particles related modification is selected from the group consisting of: forming amine groups onto the exposed hemispheres, forming carboxyl groups onto the exposed hemispheres, coupling of amine functionalized silica nanoparticles to a PMSQ-COOH amphiphilic Janus particles.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

The present invention is not limited in its application to the details of construction and the arrangement of the components set forth in the following description. The invention is capable of other embodiments, or of being practiced or carried out in various ways. Also, it is to be understood that the phraseology and terminology employed herein is for the purpose of description and should not be regarded as limiting.

The present invention provides a system and method for large-scale fabrication of amphiphilic Janus particles based on the immobilization of nanoparticles onto PC microspheres via polymer precipitation. The present invention involves large-scale production of Janus particles, independent of temperature fluctuation.

Figure 1:
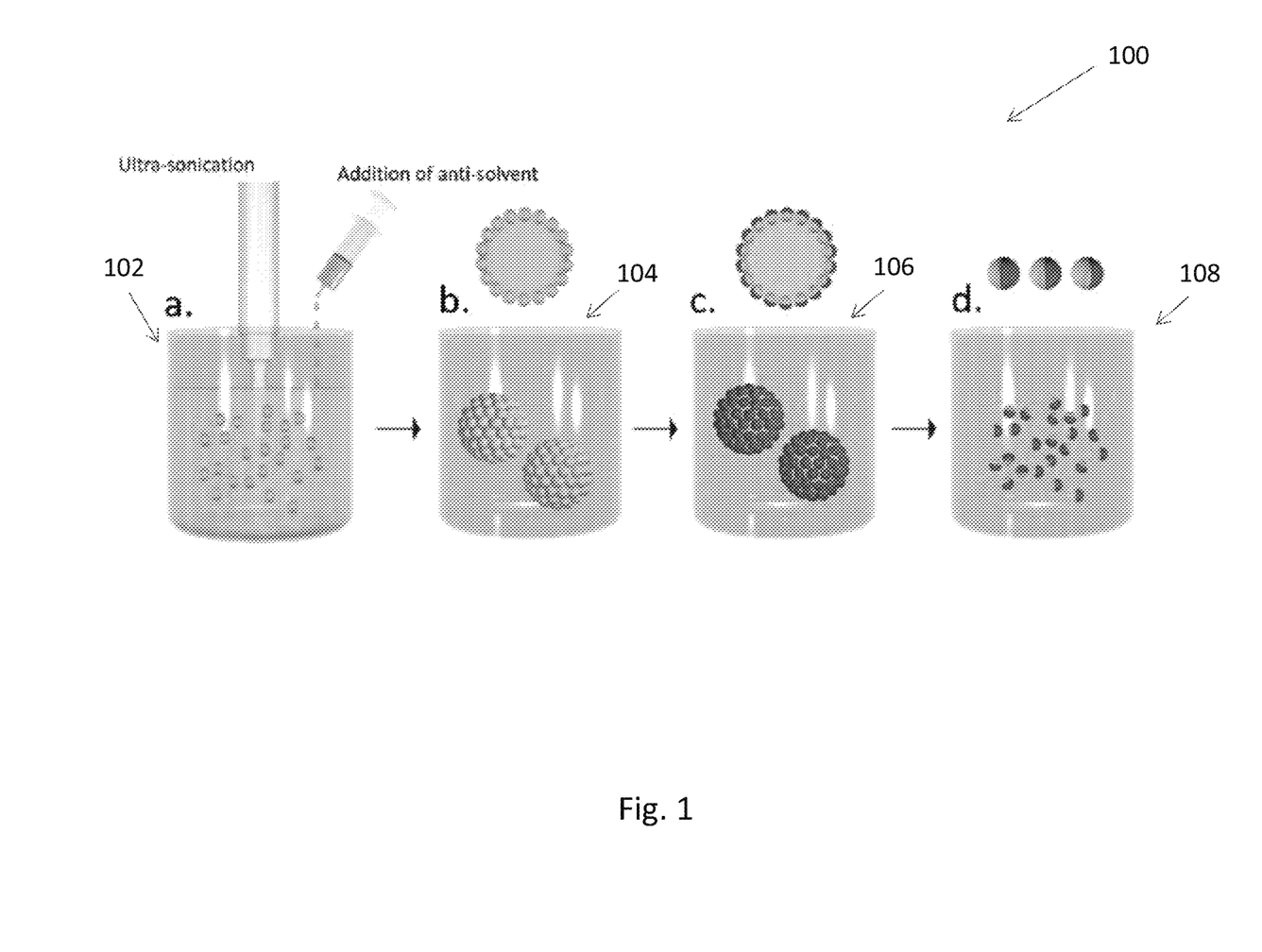
FIG. 1 is a schematic illustration of the system and method according to an embodiment of the present invention.

FIG. 1 is a schematic illustration of the system and method 100. Initially, nanoparticles, for example, polymethylsilsesquioxane (PMSQ) nanoparticles are added into a polycarbonate-based solution, for example, polycarbonate in Tetrahydrofuran (THF), in the vessel 102, a standard reaction vessel. Polycarbonate is used for example, as it exhibits very high mechanical properties which allow for high yields particular by the fabrication processes in large-scale productions. Furthermore, the high thermal stability of polycarbonate allows obtaining high resistance against harsh thermal conditions from high temperatures, which may occur during production.

At a second stage, an anti-solvent or surfactant, such as Dimethyl didodecyl ammonium bromide (DDAB) in water is added, at a rate of approximately 1 mL/min, into the vessel 102. Ultra-sonication is applied contemporaneously and, for example, simultaneously with the Dimethyl didodecyl ammonium bromide (DDAB) and water in order to generate polymer precipitation. Ultra-sonication is provided by, for example, an ultrasonic liquid processor, such as Sonics Vibra-cell ultrasonic liquid processor, Model-VCX 750. Ultra-sonication ensures that the precipitate is evenly distributed and that particles attaching to the polymer surface rapidly, with respect to the geometry of the precipitate and the close (dense) packing of the particles. During this stage, nanoparticles are assembled on the surface of polycarbonate (PC) microspheres, as shown in the vessel 104.

At a third stage, the polymer precipitate is filtered, for example, via centrifugation, rinsed with deionized water to remove residues and weakly attached nanoparticles, and dried for example, under vacuum conditions at 35° C. for 3 h.

At a fourth stage, the exposed hemispheres of the embedded nanoparticles are subjected to a chemical modification in order to add an amphiphilic particles related modification, for example, adding an amine group. This modification is performed using for example, (3-aminopropyl) triethoxysilane (APTES), as shown in the vessel 106. (3-aminopropyl) triethoxysilane (APTES) is an aminosilane used to silanize the exposed hemispheres of the embedded nanoparticles by adding amine groups onto the exposed hemispheres.

At a final stage, the polymer is dissolved in an organic solvent, such as polycarbonate (PC) with THF to free the nanoparticles from the polycarbonate microspheres. The now free particles, shown in the vessel 108, can be subjected to additional chemical modifications such as adding a carboxyl group.

The created microspheres, as shown in the vessel 104, freeze the particles to fixed positions. This prevents the movement of particles in the aforementioned chemical modification stage, as well as preventing the rotation of particles at liquid-liquid interface. At a two-stage chemical modification, the created microspheres eliminate the need to find a liquid-liquid combination in which the reactant is soluble in only one liquid. Furthermore, the created microspheres enable the separation and purification processes to become more efficient.

While the aforementioned stages are provided above, the order thereof is exemplary, and other orders of these stages are also permissible.

Figure 2:
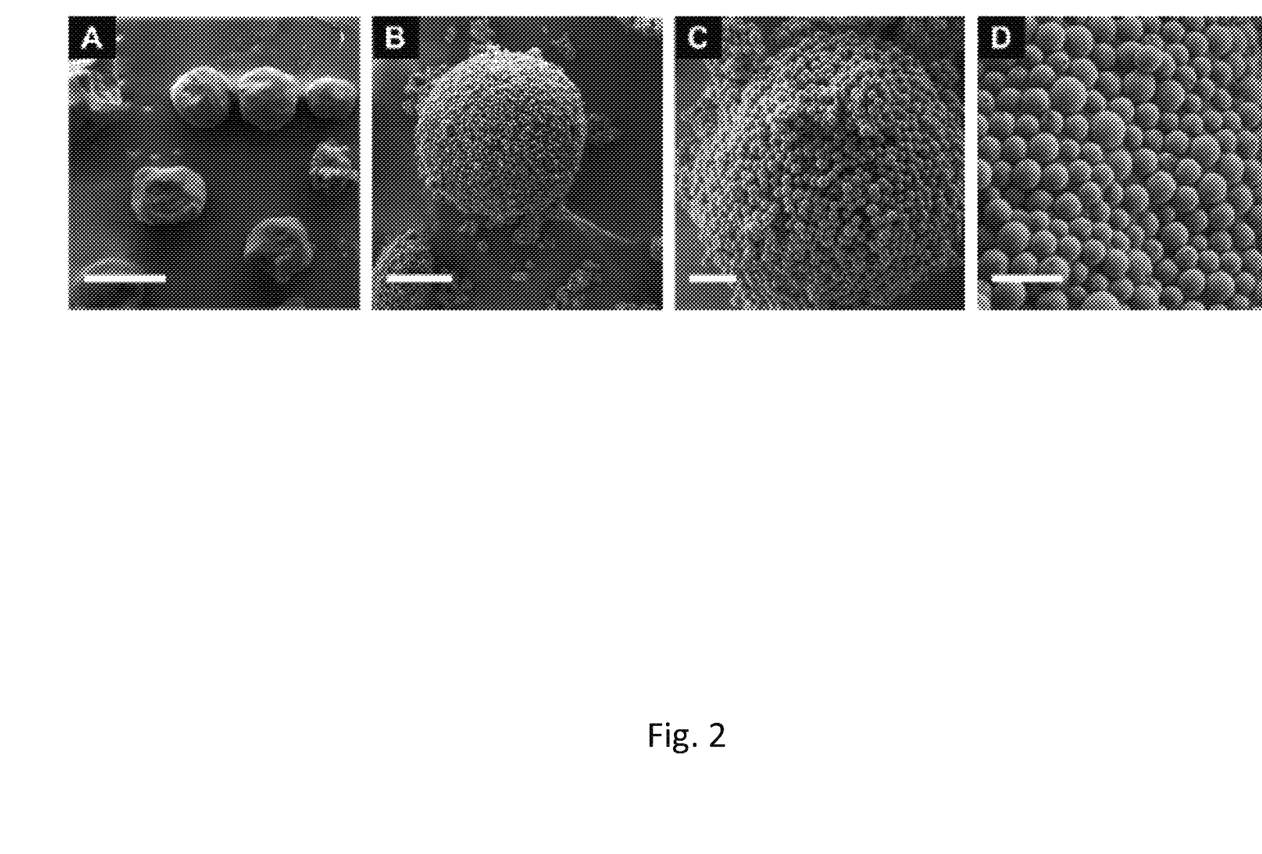
FIG. 2 are scanning electron microscope (SEM) images (A-D) illustrating polymethylsilsesquioxane (PMSQ) embedded on polymer precipitate (core and shell) structures.

FIG. 2 are scanning electron microscope (SEM) images (A-D) illustrating polymethylsilsesquioxane (PMSQ) embedded on polymer precipitate (core and shell) structure. Images A-C are micrographs of different scale bars of spherical polymer precipitate that is filtered from water. The scale bars are 500 μm (A), 50 μm(B), 10 μm(C). Image D is an enlarged view of polymethylsilsesquioxane (PMSQ) particles monolayer on the surface of a polycarbonate (PC) microsphere. The scale bar is 5 μm(D).

Figure 3:
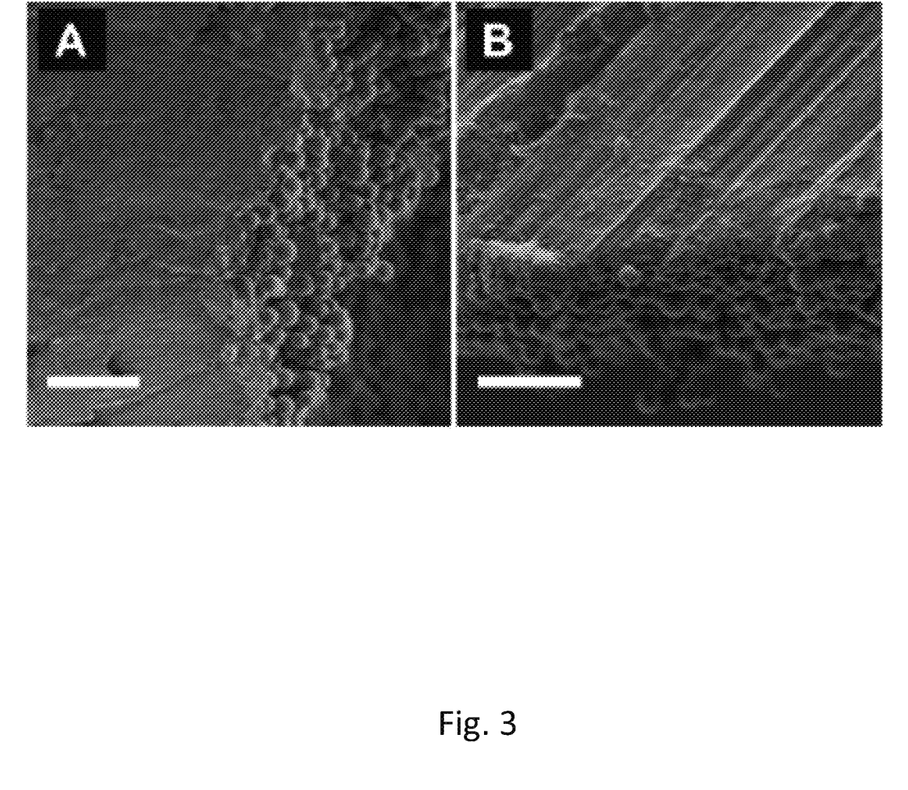
FIG. 3 are scanning electron microscope (SEM) images (A-B) illustrating cross sectional structures of polymer precipitate.

FIG. 3 are scanning electron microscope (SEM) images (A-B) illustrating cross sectional structures of polymer precipitates. These images of the precipitate reveal that there are no visible unattached particles. This shows that unattached particles were present only in the water phase and that the particles are embedded on the surface of the polymer precipitate and not inside.

EXAMPLES

The following examples are not meant to limit the scope of the claims in any way. The following examples are put forth so as to provide those of ordinary skill in the art with a complete disclosure and description of how to make and use the described invention, and are not intended to limit the scope of the invention, nor are they intended to represent that the experiments below are all or the only experiments performed. Unless indicated otherwise, parts are parts by weight, molecular weight is weight average molecular weight, temperature is in degrees Centigrade, and pressure is at or near atmospheric.

Example 1

Preparation of Polycarbonate/Polymethylsilsesquioxane (PC/PMSQ) Microspheres Polymer precipitation property was utilized for the fabrication of polymethylsilsesquioxane (PMSQ) amphiphilic Janus particles. 0.2 g of PMSQ particles were added to 10 wt % PC solution in tetrahydrofuran (THF) (2 mL). To this mixture, 5 mL aqueous solution (anti-solvent) of DDAB (60 mg/L) was slowly added, under an ultrasonic field (20% amplitude, Sonics Vibra-cell ultrasonic liquid processor, Model-VCX 750, Newtown, Conn., USA), at a rate of 1 mL/min, resulting in precipitation of micron-scale PC precipitates with adsorbed PMSQ particles on their surface to form PC/PMSQ microspheres. Subsequently, the microspheres were filtered and rinsed with deionized water to remove excess and weakly attached PMSQ particles. The PC/PMSQ microspheres were then dried at 35° C. under vacuum for 3 hours.

Example 2

Fabrication of PMSQ-NH2 Amphiphilic Janus Particles

For the silanization of the APTES molecules (amine edge group) to the exposed hemispheres of the PMSQ particles, 2 mmol of APTES in 10 mL methanol solution were added to the dried PC/PMSQ microspheres and stirred at 500 rpm for 48 h under ambient conditions forming amine groups onto the exposed hemispheres. After silanization, the reactant mixture was centrifuged at 9000 rpm for 10 min at 25° C. Subsequently, the PC/PMSQ-NH2 microspheres were rinsed five times with methanol to remove excess unreacted APTES. The PMSQ-NH2 particles were then separated from the PC precipitates by dissolving the PC cores using THF, followed by five successive cycles of centrifugation and rinsing with THF. Two more cycles of centrifugation and rinsing with ethanol were carried out to remove PC, physically attached APTES, and DDAB from the PMSQ-NH2 particles. The resulting particles were then dried at 35° C. under vacuum for 3 hours.

Example 3

Fabrication of PMSQ-COOH Amphiphilic Janus Particles

Modification of the exposed hemispheres of the PMSQ-NH2 Janus particles to introduce carboxyl groups was done via an amidation reaction of the amine groups with succinic anhydride to form the N-[3-(Triethoxysilyl)propyl]succinamidic acid ligand, which contains a carboxyl edge group (PMSQ-COOH). 0.1 g of PMSQ-NH2 particles were added to a 2 mL stock solution of 70 mg of succinic anhydride in 10 mL of acetonitrile together with 0.02 mL of EDIPA. The solution was then stirred for 3 h under ambient conditions. The PMSQ-COOH particles were collected by three successive cycles of centrifugation and rinsing with water and acetonitrile. The PMSQ-COOH particles were then dried under vacuum at 35° C. for 3 hours.

Example 4

Fluorescent Labeling of PMSQ-COOH Amphiphilic Janus Particles

Stock solutions of 100 mg of EDC and 1 mg of 6-aminofluorescein dye were prepared separately, each in 10 mL of 0.05 M MES (pH 6.1) buffer. The carboxyl edge groups of the ligands attached to the PMSQ particles reacted with the amine edge groups of the dye in the presence of EDC to form an amide bond. 0.05 g of the PMSQ-COOH amphiphilic Janus particles were added to a 1 mL mixture of 300 μL of the EDC, 100 μL of the dye solution, and 600 μL of the MES buffer. The solution was then mixed by vortex for 1 hours at ambient temperature. Subsequently, the mixture was centrifuged and rinsed with MES buffer to remove excess reactants. EDC was used as a cross-linker to chemically attach the PMSQ-COOH amphiphilic Janus particles to the 6-aminofluorescein dye by primarily reacting with the carboxyl groups and producing an amine-reactive O-acylisourea. This intermediate product reacted with the amino groups of the dye to yield an amide bond, releasing fluorescent-labeled PMSQ particles and urea as a byproduct.

Example 5

Synthesis of Amine Functionalized Silica Nanoparticles 1 g Silica NPs were dispersed in 40 mL methanol by mechanical mixing. 2 mM of APTES were added slowly to the solution. The reaction was performed at ambient temperature for 45 min. The amine functionalized silica particles were collected by four cycles of centrifugation followed by ethanol rinsing. The NPs were then dried under vacuum at 35° C. for 3 hours.

Example 6

Coupling of Amine Functionalized Silica Nanoparticles (NPs) to the PMSQ-COOH Amphiphilic Janus Particles Coupling of the amine functionalized silica nanoparticles to the PMSQ-COOH particles was performed by EDC/Hydroxysuccinimide (NHS) amidation (according to the procedure described in Example 4). The amine groups of the silica NPs were reacting with the carboxyl groups of the PMSQ-COOH particles, enabling to characterize the location of the carboxyl groups by direct observation of the coupled silica particles via High resolution scanning electron microscopy (HRSEM). 0.005 g of PMSQ-COOH particles and 0.002 g of amine functionalized silica NPs were added to a 1 mL mixture of 300 μL of the EDC and 700 μL of the MES buffer. The solution was then stirred for 3 h under ambient conditions. The PMSQ-silica Janus particles were separated from the reaction reagents by eight cycles of centrifugation followed by rigorous agitation with both water and acetonitrile to make sure that only covalently attached particles will remain on the surface of the PMSQ-COOH particles. The particles were then dried under vacuum at 35° C. for 3 hours.

Example 7

Confirmation of Janus Character

Figure 4:
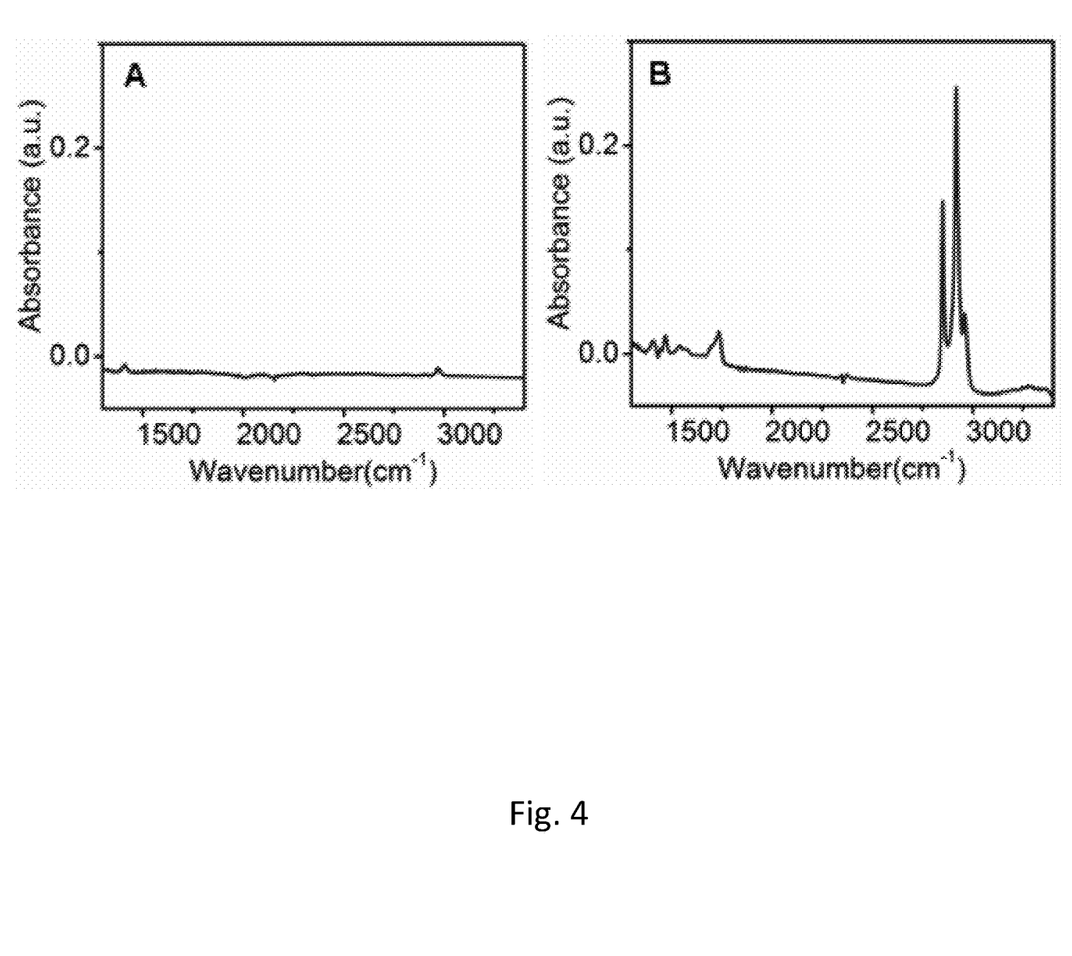
FIG. 4 is a Fourier-Transform Infrared spectroscopy (FTIR) analysis of bare polymethylsilsesquioxane (PMSQ) particles in comparison to polymethylsilsesquioxane (PMSQ) Janus nanoparticles.

Fourier-Transform Infrared spectroscopy (FTIR) analysis was used in order to confirm the presence of different functional groups on the surface of polymethylsilsesquioxane (PMSQ) spheres. FIG. 4 is a Fourier-Transform Infrared spectroscopy (FTIR) analysis of bare polymethylsilsesquioxane (PMSQ) particles in comparison to polymethylsilsesquioxane (PMSQ) Janus nanoparticles. FIG. 4A shows the FT-IR spectrum of bare polymethylsilsesquioxane (PMSQ) spheres. The absorption peaks at 1900 and 1300 $cm^{-1}$ represent bare polymethylsilsesquioxane (PMSQ) and (3-aminopropyl) triethoxysilane (APTES) after amidation. FIG. 4B shows the asymmetrical deformation vibration of the amino group at 1425, 1575-1585 $cm^{-1}$, indicating that the amino groups were fixed onto the polymethylsilsesquioxane (PMSQ) particle surface successfully. In addition, peaks in the ranges of 2865-2875 $cm^{-1}$ and 2930-3100 $cm^{-1}$ are respectively attributed to CH2 and C—H stretching vibrations. The further modification of the polymethylsilsesquioxane (PMSQ)-NH2 particles with succinic anhydride for the introduction of the carboxyl function can be seen in the FT-IR spectra through the occurrence of the carboxylate peak, and the peaks at 1725 and 1461 $cm^{-1}$, all correspond to the vibration peaks of the —COOH. This indicates that a sequential modification on the polymethylsilsesquioxane (PMSQ) spheres surface took place.

Example 8

Special Interfacial Activity of Janus Particles

Figure 5:
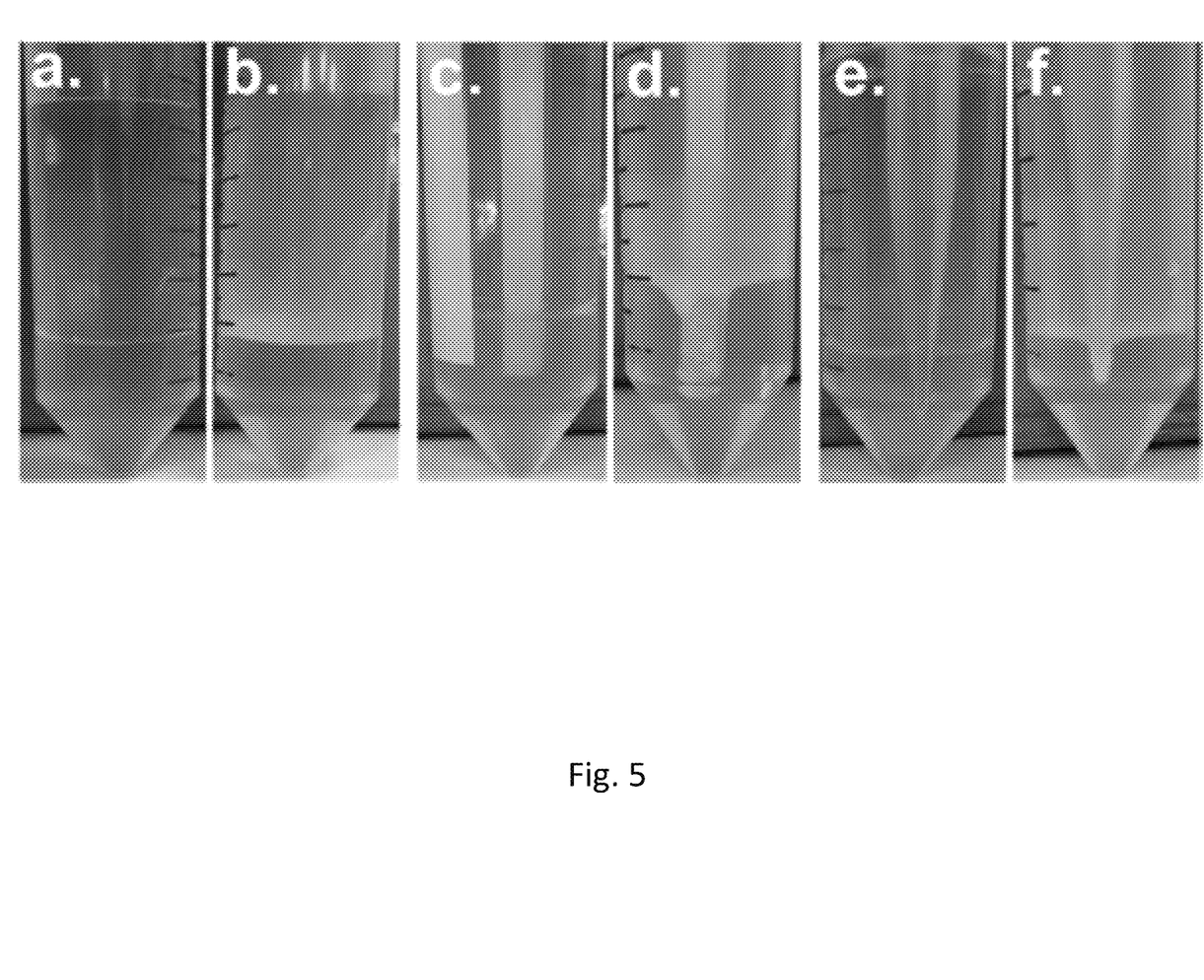
FIG. 5 are images illustrating the location of amphiphilic and uniformly modified nanoparticles in Chloroform-water system; and, FIG. 6 are High-Resolution Scanning Electron Microscopy (HRSEM) micrographs (A-C) of characteristic PMSQ-silica particles.

PMSQ-COOH amphiphilic Janus particles were added to a water-clorofrom biphasic system. FIG. 5 depicts snapshots of bare PMSQ (FIG. 5A) and PMSQ-COOH amphiphilic Janus particles (FIG. 5B) which were added to a water-clorofrom biphasic system. The observed haze at the water-clorofrom interface in FIG. 5B arises from the self-assembly of the particles, demonstrating their amphiphilic nature. By contract, the bare PMSQ particles do not self-assemble at the interface, and thus exhibit no haze (FIG. 5A). To further pinpoint the amphiphilicity of the PMSQ-COOH particles, a glass tip representing a hydrophilic surface (FIG. 5 C, D) and a polypropylene tip representing a hydrophobic surface (FIG. 5 E, F) were each immersed in the biphasic system which contained either the bare PMSQ particles or the PMSQ-COOH amphiphilic Janus particles. In both the glass and polypropylene cases, the particles adsorbed to the surface of the tips (FIG. 5 D, F). The adsorption of the PMSQ-COOH amphiphilic particles to the polar glass tip is caused by the interaction of their hydrophilic hemispheres (COOH groups) with the glass surface (FIG. 5D) and vice versa in the case of the polypropylene tip, where the particles are adsorbed by their hydrophobic hemispheres (untreated/pristine PMSQ) as shown in FIG. 5F. No adsorption took place in either case when bare PMSQ particles were added to a water-chloroform biphasic system, as can be seen in FIG. 5 C, E, respectively.

Example 9

Figure 6:
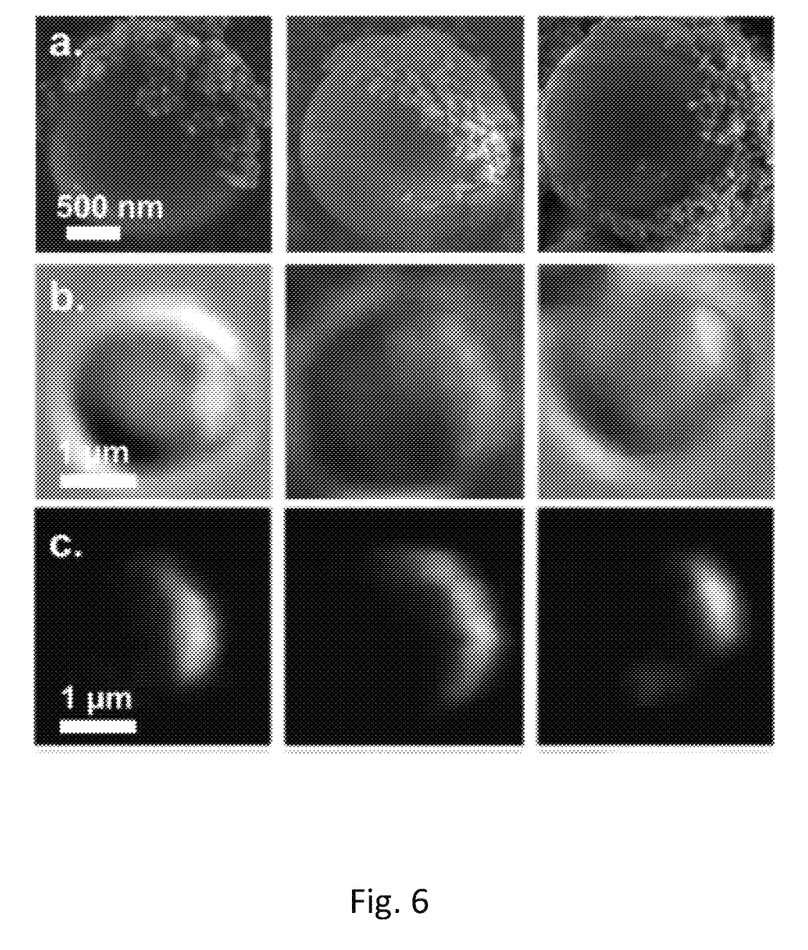

Analysis of Polymethylsilsesquioxane (PMSQ) Janus Particles Labelled with Fluorescence Dye FIG. 6A depicts High-Resolution Scanning Electron Microscopy (HRSEM) micrographs of characteristic PMSQ-silica particles. The decoration of the silica NPs is observed selectively on a given hemisphere of the PMSQ-COOH particles which clearly confirms the Janus characteristic of the fabricated particles, i.e., during their silanization with APTES while embedded on the PC precipitate, their exposed hemispheres were selectively functionalized. These findings conclusively confirm the successful fabrication of amphiphilic Janus PMSQ particles having a hydrophilic side (containing COOH) and a pristine hydrophobic side. Confocal microscopy images of characteristic PMSQ-COOH particles which where fluorescently labeled through their carboxyl groups are shown in FIG. 6 B, C. 6-aminofluorescein was reacted with the carboxyl groups of the PMSQ-COOH particles resulting in their selective fluorescent labeling. FIG. 6C depicts images that show the fluorescein signal alone. The images further confirms the Janus characteristic of the PMSQ-COOH particles, since unlike the functionalized hemispheres, the embedded hemispheres do not exhibit any fluorescent signal. In order to capture a single amphiphilic Janus particle by confocal microscopy, the particle has to be located in the focal plane at the right orientation. FIG. 6 B, C depicts characteristic PMSQ particles that were located in the focal plane and therefore their symmetry braking can be clearly observed. This particles were captured in a cross sectional point of view.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A method for creating large scale of amphiphilic particles comprising:
   adding nanoparticles into a polycarbonate-based solution including a solvent;
   adding a surfactant into said solution while performing ultrasonication to generate polymer precipitation, said polymer precipitation is configured for creating at least one microsphere with said nanoparticles embedded onto it, said nanoparticles are embedded such that one of their hemispheres is exposed for further modification; and
   subjecting said exposed hemisphere of said embedded nanoparticles to a further amphiphilic particles related modification; and
   separating said amphiphilic modified embedded nanoparticles by dissolving the polycarbonate from said at least one microsphere using the solvent.

2. The method of claim 1 additionally comprising: filtering said at least one microsphere using centrifugation, rinsing said at least one microsphere with deionized water and drying said at least one microsphere under vacuum before subjecting said exposed hemisphere of said embedded nanoparticles to a further amphiphilic particles related modification.

3. The method of claim 1, wherein the solvent in said polycarbonate-based solution includes tetrahydrofuran (THF).

4. The method of claim 1 wherein, said nanoparticles are polymethylsilsesquioxane (PMSQ) nanoparticles.

5. The method of claim 1 wherein, said nanoparticles are silica nanoparticles.

6. The method of claim 1 wherein, said surfactant is Dimethyl didodecyl ammonium bromide (DDAB) in water.

7. The method of claim 1 wherein, said further amphiphilic particles related modification is selected from the group consisting of: forming amine groups onto the exposed hemispheres, forming carboxyl groups onto the exposed hemispheres, coupling of amine functionalized silica nanoparticles to a PMSQ-COOH amphiphilic Janus particles.

* * * * *